(12) United States Patent
Lindsey

(10) Patent No.: US 6,748,144 B2
(45) Date of Patent: Jun. 8, 2004

(54) SYSTEM AND METHOD FOR COUPLING AND REDIRECTING OPTICAL ENERGY BETWEEN TWO OPTICAL WAVEGUIDES ORIENTED AT A PREDETERMINED ANGLE

(75) Inventor: Lonnie D. Lindsey, Westminster, CA (US)

(73) Assignee: Cyber Operations, LLC, Jupiter, FL (US)

( * ) Notice: Subject to any disclaimer, the term of this patent is extended or adjusted under 35 U.S.C. 154(b) by 0 days.

(21) Appl. No.: 10/627,049

(22) Filed: Jul. 25, 2003

(65) Prior Publication Data
US 2004/0022497 A1 Feb. 5, 2004

Related U.S. Application Data

(62) Division of application No. 10/126,914, filed on Apr. 19, 2002, now Pat. No. 6,636,663.

(51) Int. Cl.[7] .................................................. G02B 6/26
(52) U.S. Cl. .............................. 385/50; 385/33; 385/53; 385/47; 385/93
(58) Field of Search ............................... 385/31–33, 47, 385/48, 50, 53, 73, 74, 92, 49

(56) References Cited

U.S. PATENT DOCUMENTS

| 6,204,501 | B1 | 3/2001 | Cutler ........................ 250/352 |
| 6,289,149 | B1 | 9/2001 | Druy et al. .................... 385/31 |
| 6,421,474 | B2 | 7/2002 | Jewell et al. .................. 385/14 |
| 2003/0210866 | A1 * | 11/2003 | Kuhara et al. ................ 385/49 |

OTHER PUBLICATIONS

Search Report for PCT/US02/12450 mailed Sep. 27, 2002.

* cited by examiner

Primary Examiner—Phan T. H. Palmer
(74) Attorney, Agent, or Firm—King & Spalding LLP

(57) ABSTRACT

An optical waveguide coupler can be adjusted in the field and can couple and redirect optical energy leaving a first optical waveguide oriented in a first position into a second optical waveguide oriented in second position different from the first position. The optical coupler can maximize the optical energy transfer between two optical waveguides, while minimizing any back reflection or other optical return losses. The optical coupler provides an automatic core-to-core alignment of optical waveguides in free space by using aspherically shaped lenses with predetermined prescriptions in combination with a reflecting device that is accurately positioned between the two lenses.

12 Claims, 8 Drawing Sheets

SYSTEM AND METHOD FOR COUPLING AND REDIRECTING OPTICAL ENERGY BETWEEN TWO OPTICAL WAVEGUIDES ORIENTED AT A PREDETERMINED ANGLE

CROSS REFERENCE TO RELATED APPLICATION

This application is a divisional of and claims priority to U.S. application Ser. No. 10/126,914, filed Apr. 19, 2002, now U.S. Pat. No. 6,636,663, entitled "System and Method for Coupling and Redirecting Optical Energy Between Two Optical Waveguides Oriented at a Predetermined Angle," the entire contents of which are incorporated by reference.

TECHNICAL FIELD

The present invention relates to optical structures. More specifically, the present invention relates to a system and method for coupling and redirecting optical energy between two optical waveguides oriented at a predetermined angle relative to each other, such as an angle having a magnitude of ninety degrees.

BACKGROUND OF THE INVENTION

Communication networks rely on optical networks to transmit complex communication data, such as voice and video traffic. This voice and video traffic propagated over the optical network usually takes the form of high frequency optical signals that have a relatively high bit rate.

To support these high frequency optical signals, optical networks typically comprise a large volume of fiber optic cables that extend over long distances. Because the fiber optic cables extend over long distances, these cables usually encounter obstacles or redirection that are common with any utility line. In other words, the fiber optic cables of optical networks can be routed under streets and highways with multiple twists, turns, and junctions. The fiber optic cables also can extend between buildings in above-ground supporting environments, such as between telephone poles that have several changes in direction.

In many of these routing situations, the fiber optic cables are directed at various angles relative to the origination or starting point of the fiber optic cable. To change direction or to connect a fiber optic cable to another fiber optic cable, an operation known as splicing can be performed to connect fiber optic cables together.

The splicing of fiber optic cables can be a tedious and time-consuming process. For example, splicing fiber optic cables is similar to handling cables with diameters that approach the diameter of a human hair. For a typical splice of a fiber optic cable, two separate fiber optic cables are cut. Next, their ends are polished and then their ends are compressed together.

While the ends are compressed together, it is necessary for the geometric center of these human hair-size cables to be properly aligned. If these human hair-like fiber optic cables are not properly aligned, substantial losses in optical power can occur at the splice. In other words, optical energy leaving one fiber optic cable is not completely transferred into the other fiber optic cable because of the misalignment of the fiber optic cables relative to each other.

After splicing, the junction or splice can be placed in one of several different types of protective enclosures to protect the splice from exposure to environmental effects. For example, the splice can be placed within a splice box, a conduit, or within a breakout panel. These protective enclosures can be placed in a manhole, in a pedestal, or in drop points adjacent to the subscribers of the optical network. Protecting splices with enclosures demonstrates that splicing of fiber optic cables can be a costly and time consuming process that does not guarantee optical coupling efficiency.

In addition to the problems associated with splicing, fiber optic cables cannot be bent at very large angles such as ninety degrees without suffering substantial optical power losses. To prevent such power losses, fiber optic cables are gradually routed around the obstacles at angles substantially less than ninety degrees. The gradual routing of fiber optic cables requires an even distribution of the weight for the additional cable needed to make this cable routing.

The gradual routing can also relieve the physical stresses within a fiber optic cable that are associated with the bending of the fiber optic cable at these gradual angles. Stress caused by the gradual routing of a fiber optic cable should be minimized in order to eliminate micro-bending. Micro-bending can cause greater losses at longer optical wavelengths, such as the optical wavelengths that support dense wavelength division multiplexing.

The gradual routing of fiber optic cables at angles substantially less than ninety degrees around objects is usually referred to as a wide bending radius technique. Another major drawback of larger bending techniques, in addition to the problems of stress and the amount of cable to perform the operation, is that such techniques require a substantial amount of space. To alleviate the problems of fiber optic cable splice connections and wide bending radius techniques, optical connectors have been proposed to couple one fiber optic cable oriented in a first direction and a second fiber optic cable oriented in a second direction. However, conventional optical connectors are usually permanent in nature, meaning that adjustments to the connector and any optics contained in the connector cannot be made during installation in the field. If there are any problems with the optics contained within the conventional optical connector, the connector usually must be discarded instead of repaired. Further, if any adjustments to the optics within the optical connector are necessary, such adjustments cannot be made in the field since the connectors are typically designed to permanently encase or house the optics contained therein.

Another drawback of conventional optical connectors is that very few of these conventional optical connectors can withstand the harsh operating environments of optical cables. For example, optical connectors can be exposed to high temperatures as well as fluids for certain applications. The optical connectors must be able to withstand harsh temperatures and to keep out any fluids that may come in contact with the fiber optic cables and the connector.

Accordingly, there is a need in the art for a system and method for coupling and redirecting optical energy between two optical waveguides oriented at a predetermined angle relative to each other. There is also a need in the art for a system and method for coupling and redirecting optical energy between two optical waveguides that permits adjustments to the optics housed in the optical coupler while in the field or operating environment. In other words, there is a need in the art for an optical coupler that has fielded adjustable optics to permit the adaptation of the optical coupler to various types and sizes of optical waveguides.

Further, there is also a need in the art for an optical coupler that is impervious to any liquids that are present in the operating environment of the optical couple and optical waveguides. There is also a need in the art for optical couplers that can withstand harsh operating environments where the optical coupler can be subjected to high temperatures.

A further need exists in the art for optical couplers that employ optical waveguide connectors that can comprise the size and dimensions of any one of industry standard connectors known in the art. There is also a need in the art for optical couplers that can meet or exceed industry standards for optical connectors.

Additionally, the need exists in the art for optical couplers that can maximize the optical energy transfer between two optical waveguides, while minimizing any back reflection or other optical return losses. There is also a need in the art for optical couplers that provide automatic core-to-core alignment of optical wave guides in free space. Further, there is also a need in the art for optical couplers that can provide a junction or connection point between different types of optical waveguides, such as single mode optical fibers, or optical waveguides, such as multi-mode optical fibers.

SUMMARY OF THE INVENTION

The present invention is generally drawn to a system and method for coupling and redirecting optical energy between two optical waveguides oriented at a predetermined angle relative to each other. More specifically, the present invention provides an optical waveguide coupler that can be adjusted in the field and which can couple and redirect optical energy from a first optical waveguide oriented in a first position into a second optical waveguide oriented in second position different from the fist position. That is, the optical waveguide coupler according to one exemplary aspect of the present invention can be assembled and readjusted while in its operating environment, outside of any typical manufacturing environment.

There are at least two features of the present invention that make this system and method for coupling and redirecting optical energy between two optical waveguides a substantial improvement over the art: 1) the mechanical properties of the optical coupler; and 2) the discrete optics that are positioned within the connector housing and connectors. Regarding the mechanical properties of the optical coupler, the optical coupler can comprise a connector housing in one exemplary embodiment that can be made from metal. Exemplary metals include, but are not limited to, steel, copper, nickel, or aluminum. The material for the housing is usually selected such that its coefficient of expansion is less than the coefficient of expansion for the first cover or second cover or both. The connector housing can also be made from polycarbonate material, such as a polycarbonate material sold under the tradename DELRIN. Although the connector housing can take the form of a cube structure, other shapes of the connector housing are not beyond the scope of the present invention.

A first cover that attaches to the connector housing and supports a mirror positioned within the connector housing can be made from a polycarbonate material, such as a polycarbonate material sold under the tradename DELRIN. Alternatively, in another inventive aspect, the first cover can be made from a composite ceramic material, such as a ceramic material sold under the tradename ALLTEMP. A second cover, opposing the first cover, also attaches to the connector housing and can be made from the same materials as the first cover.

The first cover and second cover can have a stepped region for contacting walls of the connector housing such that the first and second covers can attach to the connector housing with a snapped fit. More specifically, the first and second covers can have a coefficient of thermal expansion relative to the coefficient of thermal expansion of the connector housing such that the first and second covers expand at a more rapid rate relative to any expansion of the connector housing.

The "snapped-fit" of the first and second covers can allow the optical waveguide coupler of the present invention to be field adjustable, unlike static and permanent optical connectors of the prior art. Further, this "snap-fit" between the covers and the connector housing can also make the optical coupler impervious to penetration by any liquids that are present outside of the optical coupler. In other words, the first and second covers can form a waterproof or airtight seal with the connector housing. While the first and second covers snap together to form this seal, the covers can also be removed after assembly such that the optics within the connector housing can be adjusted.

The connectors that attach the optical waveguides to the connector housing can also be made from polycarbonate material, sold under the tradename DELRIN. In another inventive aspect, the connectors can be made from a composite ceramic material sold under the tradename ALLTEMP. In addition to supporting the optical waveguides, the connectors can also support and hold one or more discrete optics in predetermined and precise positions. For example, the connectors can support lenses that focus the optical energy propagating through the optical waveguides.

The connectors can comprise dimensions of any one of industry standard connectors known in the art. For example, the connectors can comprise ferrule connectors (FC) that have a threads for a screw-type connection between the connector housing and the connectors. In another inventive aspect, the connectors can comprise subscriber connectors (SC) that have a square bayonet snap connection. Alternatively, the connectors can comprise lucent connectors (LC). Other connector types include fiber distribution data interface (FDDI) and straight tip (ST) connectors.

The materials selected for the connector housing, first and second covers, and connectors can allow the optical coupler to withstand harsh operating environments. For example, the optical coupler could be subjected to high temperatures produced from either the surrounding environment or the optical energy transferred between the optical waveguides or both. More specifically, the materials selected for the connector housing, first and second covers, and connectors can allow the optical coupler to withstand high temperatures, such as between −80 degrees Celsius and +85 degrees Celsius.

Because the optical coupler can withstand wide ranges of temperature as remain impervious to liquids outside the optical coupler, the optical coupler can usually meet or exceed several industry standards for optical connectors, such as BELLCORE standards. Further, the size and shape of the optical coupler and the snap-fit covers allow this device to be easily manufactured compared to other optical connectors that require permanent fasteners, such as welds and adhesives.

While the mechanical features of the present invention provide significant advantages over the prior art, the discrete optics supported by the connectors and the connector housing also provide additional advantages. The optical coupler can maximize the optical energy transfer between two optical waveguides while minimizing any back reflection or other optical return losses. The optical coupler can maximize optical energy transfer between optical waveguides disposed at an angle by providing core-to-core alignment of optical waveguides in free space.

For one aspect of the invention, the optical coupler can provide a junction or connection point between optical waveguides, such as single mode optical fibers that are positioned at a predetermined angle, such as ninety degrees, relative to each other. For another inventive aspect, the optical coupler can provide a junction or connection point between optical waveguides such as multimode optical fibers also positioned at a predetermined angle, such as ninety degrees, relative to eachother. Those skilled in the art recognize that the optical coupler can be scaled or sized depending upon the type and size of the optical waveguides being coupled together.

As noted above, the optical coupler can comprise a first cover that supports a mirror. This mirror can comprise a one-hundred percent mirror that reflects or redirects optical energy received from one optical waveguide into another optical waveguide. For one aspect of the invention, the mirror can comprise a triangularly shaped solid member that is held in position by a support mechanism that is part of the first cover.

The mirror of the optical coupler forms only a portion of the inventive optical system. The other parts of the optical system can comprise at least two lenses that are supported or precisely positioned by the two connectors. Each lens comprises an aspherically shaped lens that has a planar side and a convex side. The convex side of each aspherically shaped lens can have a prescription that maximizes the collection and redirection of optical energy. The prescription of each lens is a function of the optical coupler dimensions and a function of the optical waveguide dimensions and type.

Each convex side of each lens can face the inside of the connector housing, while each planar side of each lens can be positioned to face the optical waveguide. In this way, for a first aspherical lens, substantially all of the optical energy that exits a first optical waveguide in a dispersion cone of a predetermined angle can be collimated by the first aspherical lens and then redirected or reflected by the mirror.

The optical energy that is reflected from the mirror can be propagated into a second aspherical lens where the convex side of the second aspherical lens can focus the collimated optical energy into a focal point that can correspond directly with a central region of a second optical waveguide. The focused optical energy can then be propagated away from the second aspherical lens in the second optical waveguide. In this way, the optical coupler can maximize the optical energy transfer between two optical waveguides while minimizing any back reflection or other optical return losses. The optical coupler can maximize optical energy transfer between optical waveguides disposed at an angle by providing an automatic core-to-core alignment of optical waveguides in free space that is dependent on the precise positioning of the lenses in each connector, the position of the reflecting device in the housing, and the positions of each connector relative to the housing.

According to an alternate aspect of the present invention, the optical system can comprise a solid member that includes the aspherical lenses coupled to the mirror. In other words, the optical system can comprise a single member that has the aspherical lenses and the mirror connected or bonded together. The single member and lenses can be made from an optical grade polycarbonate.

DETAILED DESCRIPTION OF EXEMPLARY EMBODIMENTS

Figure 1:
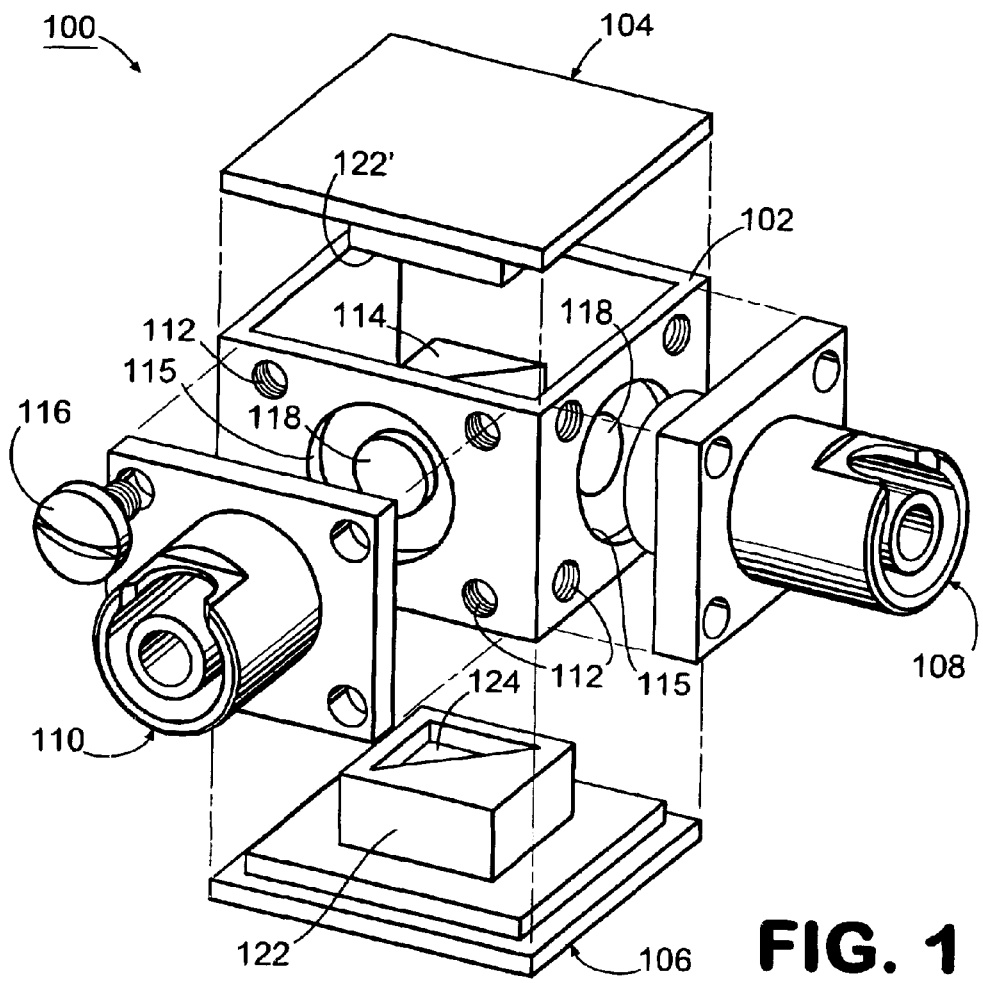
FIG. 1 is an assembly diagram of core components of an optical coupler constructed in accordance with an exemplary embodiment of the present invention.

Referring now to the drawings, in which like numerals represent like elements throughout the several figures aspects of the present invention in the illustrative operating environment will be described.

FIG. 1 is an assembly diagram of an exemplary optical coupler 100 according to the exemplary embodiment of the present invention. The optical coupler 100 can comprise a connector housing 102, a first cover 106, and a second cover 104. The optical coupler 100 may further comprise a first connector 108 and a second connector 110.

The connector housing 102 can take the form of a cubed-shaped structure. However, other shapes of the connector housing 102 are not beyond the scope of the present invention. For example, the connector housing 102 could take the form of a circular, triangular or rectangular shape. The connector housing 102 can be made from metal. Exemplary metals include, but are not limited to, steel, copper, nickel, or aluminum. The material for the connector housing 102 is usually selected such that its coefficient of expansion is less than the coefficient of expansion for the first cover 106 or second cover 104 or both.

In a preferred exemplary embodiment, the connector housing 102 is made from metal in order to properly engage with the first and second covers 106, 104 as will be discussed below. The connector housing 102 in one exemplary embodiment can be made from metal. Exemplary metals include, but are not limited to, steel, copper, nickel, or aluminum. The material for the housing is usually selected such that its coefficient of expansion is less than the coefficient of expansion for the first cover 106 or second cover 104 or both. The connector housing 102 in another exemplary embodiment can also be made from a polycarbonate material, such as a polycarbonate material sold under the tradename DELRIN. Other materials for the connector housing are not beyond the scope and spirit of the present invention.

The connector housing 102 further comprises apertures 112 for receiving the first and second connectors 108, 110. The apertures 115 are aligned with a reflecting device 114, as will be described in further detail in the Figures below. The connector housing 102 further comprises connection openings 112 for receiving fastening mechanisms such as screws 116. The connection openings 112 may comprise threads in order to engage with the fastening mechanisms 116. The fastening mechanisms 116 attach the connectors 108 and 110 to the connector housing 102. However, those skilled in the art recognize that other fastening or attachment mechanisms for coupling the connectors 108, 110 to the connector housing 102 are not beyond the scope of the present invention. For example, other fastening or attachment mechanisms could include, but are not limited to, bolts and nuts, adhesives, and other like fastening or attachment mechanisms that permit the removal of the connectors 108, 110 relative to the connector housing 102. Reference numerals 118 denote relative positions of lens 300 (not shown in FIG. 1) that will be discussed in further detail below.

The first cover 106 attaches to the connector housing 102 and supports the reflecting device 114 that can be positioned within a central portion of the connector housing. The first cover 106 can be made from a polycarbonate material, such as the polycarbonate material mentioned above sold under the tradename DELRIN. Alternatively, in another exemplary embodiment, the first cover 106 can be made from a composite ceramic material, such as a ceramic material sold under the tradename ALLTEMP. However, those skilled in the art will appreciate that other materials for the first and second covers 106, 104 are not beyond the scope of the present invention. Other materials include, but are not limited to, acrylic and polycarbonate resin.

The first cover 106 further comprises a step region 120 that can be designed to contact one or more of the walls of the connector housing 102 such that the first cover 106 can attach to the connector housing 102 with a snapped fit. The first cover 106 further comprises an alignment mechanism 122 that supports the reflecting device 114 in a central portion of the connector housing 102. The alignment mechanism 122 further comprises a block structure that has an aperture or cutout portion 124 for receiving a portion of the reflecting device 114. However, the present invention is not limited to the block structure with the aperture 124 shown in the Figures. Other alignment mechanisms 122 can include, but are not limited to, brackets, a large volume of adhesive, tape fasteners, and other similar structures.

The aperture 124 of the alignment device 122 holds the reflecting device 114 in a predetermined position that is aligned with the geometric centers of the connectors 108, 110 when the first cover 106 is attached to the connector housing 102. Further details of the first cover 106 will be described below with respect to FIG. 6.

The second cover 104 also includes a step region 120 (not shown in FIG. 1 but shown in FIG. 5). The second cover 104 also comprises an alignment mechanism 122' that also holds the reflecting device 114 in place when the first cover 106 and second cover 104 are attached to the connector housing 102. However, the alignment mechanism 122' of the second cover 104 does not comprise aperture or cutout portion 124. Further details of the second cover 104 will be described below with respect to FIG. 5.

As noted above, the first cover 106 and second cover 104 can have step regions 122, 122' for contacting the walls of the connector housing 102 such that the first and second covers 106, 104 can attach to the connector housing 102 with snapped fit. More specifically, the first and second covers 106, 104 can each have a coefficient of thermal expansion relative to the coefficient of thermal expansion of the connector housing 102 such that the first and second covers 106, 104 expand at a more rapid rate relative to any expansion of the connector housing 102.

The "snapped-fit" of the first and second covers 106, 104 allows the optical waveguide coupler 100 to be field adjustable, unlike static and permanent optical connectors of the prior art. Further, this "snapped-fit" between the covers 106, 104 and the connector housing 102 can also make the optical coupler 100 impervious to any liquid that maybe present outside of the optical coupler 100. In other words, the first and second covers 106, 104 can form a waterproof or airtight seal with the connector housing 102. While the first and second covers 106, 104 can snap together to form this liquid impervious seal, the covers 106, 104 can also be removed after assembly thereof such that the optics within the connector housing 102 can be adjusted or modified.

The connectors 108, 110 that support the optical waveguides (not shown in FIG. 1) can be attached to the connector housing 102. In one exemplary embodiment, the connectors 108, 110 can also be made from polycarbonate material, such as polycarbonate material sold under the tradename DELRIN. In another exemplary embodiment, the connectors 108, 110 can be made from a composite ceramic material such as a polycarbonate material sold under the tradename ALLTEMP. However, other materials for the connectors 108, 110 are not beyond the scope and spirit of the present invention. Other materials include, but are not limited to, aluminum, steel, plastic, copper, and zirconium.

In addition to supporting the optical waveguides (not shown in FIG. 1) the connectors 108, 110 can also support and hold some of the discrete optics of the present invention in predetermined and precise positions as will be discussed below with respect to FIGS. 3 and 7.

The connectors 108, 110 can comprise size and dimensions of any of one of industry standard connectors known in the art. For example, in one exemplary embodiment the connectors 108, 110 can comprise ferrule connectors (FC) that have threads for a screw-type connection between the connector housing 102 and the connectors 108, 110. In another exemplary embodiment, the connectors can comprise as a subscriber connector (SC) having a square bayonet snap connection.

Alternatively, in a further exemplary embodiment, the connectors 108, 110 can comprise loosing connectors (LC). Other connector types are not beyond the scope and spirit of the present invention. Other connector types can include, but are not limited to, fiber distribution data interface (FDDI) and straight tip (ST) connectors.

The exemplary materials discussed above for the connector housing 102, first and second covers 106, 104, and connectors 108, 110 can allow the optical coupler 100 to withstand harsh operating environments. For example, the optical coupler 100 could be subject to high temperatures that are produced from either the surrounding environment of the optical coupler 100 or the optical energy being transferred between the optical waveguides (not shown) or both.

More specifically, the material selected for the connector housing 102, first and second covers 106, 104, and connectors 108, 110 can allow the optical coupler 100 to withstand high temperature operating environments such as between −80 degrees Celsius and +85 degrees Celsius. Because the optical coupler 100 can withstand such ranges of temperature as well as being impervious to liquids outside the optical coupler 100, the optical coupler 100 can usually meet or exceed several industries standards for optical connectors, such as BELLCORE standards.

Figure 2:
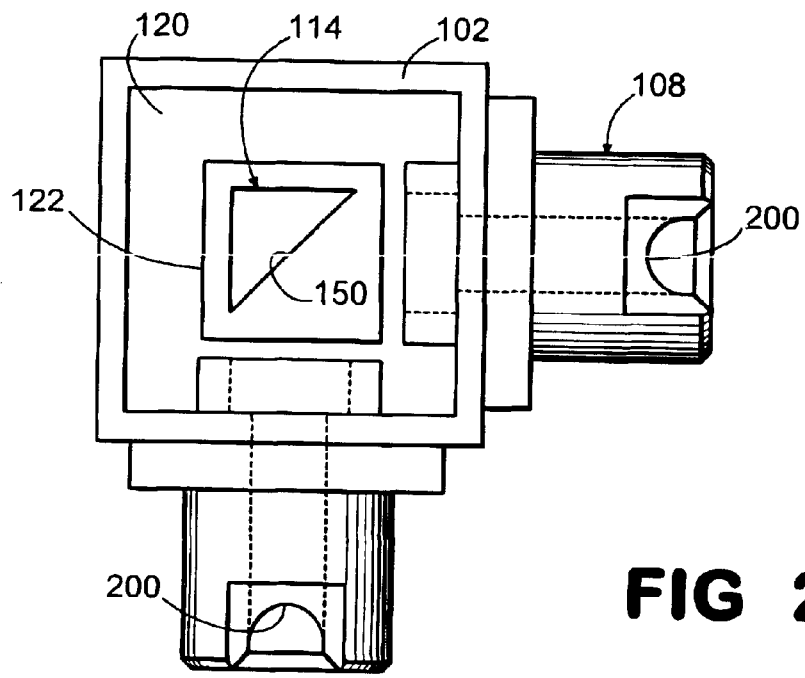
FIG. 2 is an elevational view of an optical coupler constructed in accordance with an exemplary embodiment of the present invention.

FIG. 2 illustrates an elevational view of the optical coupler 100 according to an exemplary embodiment of the present invention. The precise and accurate positioning of the reflecting device 114 by the alignment mechanism 122 of the first cover 106 can be ascertained from this view. In this exemplary embodiment, the first connector 108 is positioned at a ninety degree angle relative to the second connector 110.

In this exemplary embodiment, the reflecting device 114 has a reflecting surface 150 that is disposed at a forty-five degree angle relative to the first and second connectors 108, 110 such that optical energy can be redirected at ninety degrees from one optical waveguide (not shown in FIG. 2) into another optical waveguide (not shown in FIG. 2). The reflecting device 114 can comprise a one-hundred percent solid mirror.

However, the reflecting device 114 can comprise mirrors that are less than one-hundred percent reflective. Such mirrors with less reflective surfaces are usually not desirable in some applications because of a potential for losses in optical power being transferred from one optical waveguide to another. But for other applications, less reflective surfaces may be desired if too much optical energy is being transmitted along a particular optical waveguide. Further, the reflecting device 114 can comprise a block of material that only has the one reflective surface 150. In other words, the reflecting device 114 could comprise material that only has one reflective side.

As illustrated in FIG. 2, the reflecting device 114 comprises a triangular shape solid. But the shape and size of the reflecting device 114 can be modified without departing from the scope and spirit of the present invention. Other shapes of the reflecting device can include, but are not limited to, square, rectangular, pentagonal, and other similar shapes that may be solid or thin in relative thickness.

The first and second connectors 108, 110 illustrated in FIG. 2 can comprise ferrule connectors. Each ferrule connector 108, 110 further comprises a notch portion 200. This notch portion can comprise an industry standard fitting to align the ferrule and optical waveguide during mating thereof. This notch portion 200 is usually for eight-degree polished connectors, as known in the art.

Figure 3A:
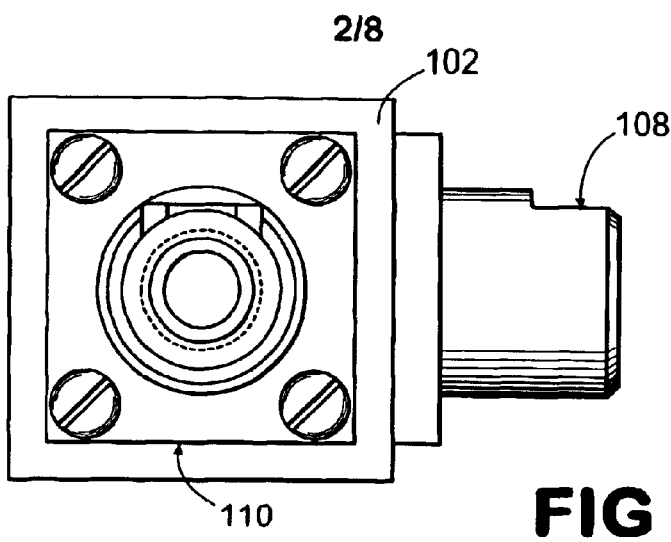
FIG. 3A is a side view of an optical coupler constructed in accordance with an exemplary embodiment of the present invention.
Figure 3B:
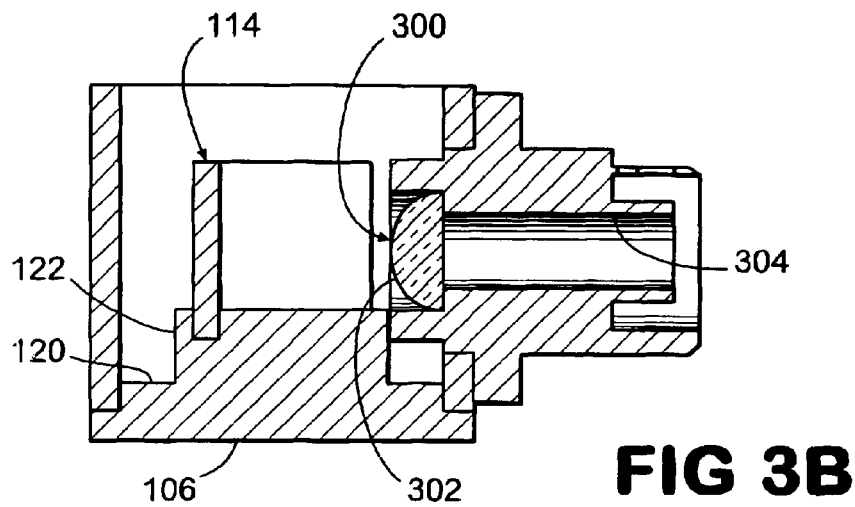
FIG. 3B is a cross-sectional view of the exemplary optical coupler illustrated in FIG. 3A.

Referring now to FIG. 3A, this figure is a side view of the optical coupler 100 according to an exemplary embodiment of the present invention. FIG. 3A further illustrates the precise alignment of the geometric centers of the connectors 108, 110 relative to the connector housing 102. FIG. 3B illustrates a cross-sectional view of the optical coupler illustrated in FIG. 3A. Further details of the optical system according to the present invention are illustrated in FIG. 3B.

Specifically, a lens 300 supported by the first connector 108 is illustrated in FIG. 3B. The lens 300 is precisely and accurately positioned within the first connector 108 such that the lens 300 is aligned with the reflecting device 114 supported by the alignment mechanism 122 of the first cover 106. The lens 300 is positioned within the first connector 108 in a notch region 302 that can comprise an aperture that has a diameter that is greater than a diameter of a cylindrical section in 304 of the first connector 108. The lens 300 comprises an aspherically shaped lens as will be discussed in further detail below with respect to FIG. 8. The alignment mechanism 122 of the first cover 106 positions the mirror 114 at a height that corresponds directly with height of the lens 300 relative to the first cover 106.

Figure 4:
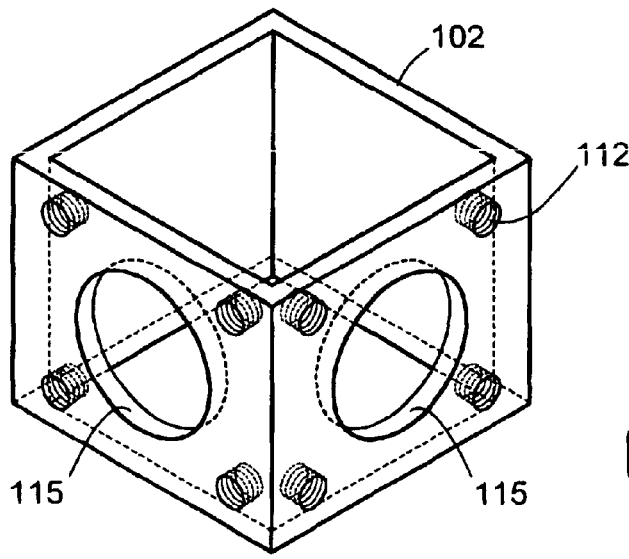
FIG. 4 is an isometric view of a connector housing according to an exemplary embodiment of the present invention.

Referring now to FIG. 4, this figure is an isometric view of the connector housing 102. FIG. 4 illustrates how the first apertures 115 for receiving the connectors 108, 110 (not shown in FIG. 4) are disposed at a predetermined angle relative to each other. In the exemplary embodiment illustrated in FIG. 4, the connector housing 102 is designed for optical waveguides that are disposed at ninety degrees angle relative to each other.

However, those skilled in the art will appreciate that the shape of the connector housing 102 or the position of the first apertures 115 could be adjusted such that optical waveguides (not shown) could be disposed at angles other than ninety degrees. The present invention is not limited to coupling optical waveguides at ninety degree angles. Other angles include, but are not limited to, ten degree angles, fifteen degree angles, thirty degree angles, forty-five degree angles, sixty degree angles, seventy-five degree angles, and other angles greater than ninety degrees and less than or equal to one-hundred eighty degrees.

Further, those skilled in the art recognize that if the reflecting device 114 and the allignment mechanisms 122 were eliminated and if the connector apertures 115 were disposed at an angle of 180 degrees relative to each other, then the present invention could provide for a straight line connection between two optical waveguides in order to eliminate the need for splicing two optical waveguides together. Other modifications to the size and shape of the connector housing 102 and the remaining elements of the optical coupler 100 are not beyond the scope and the spirit of the present invention.

Figure 5A:
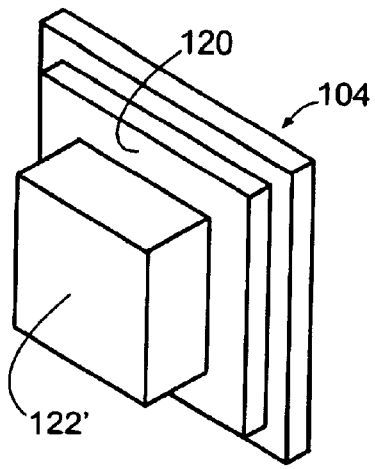
FIG. 5A is an isometric view of an exemplary coupler that attaches to a connector housing according to an exemplary embodiment of the present invention.
Figure 5B:
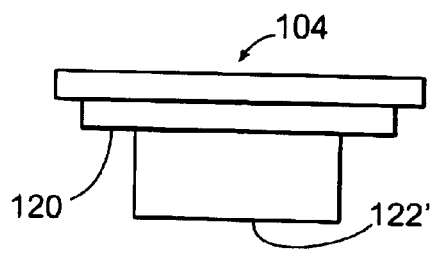
FIG. 5B is a side view of the exemplary cover illustrated in FIG. 5A.
Figure 5C:
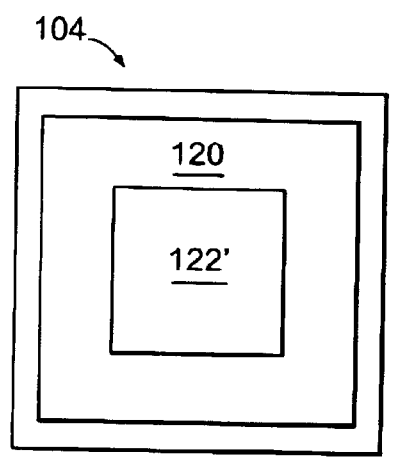
FIG. 5C is an elevational view of the exemplary cover illustrated in FIG. 5A.

Referring now to FIGS. 5A, 5B, and 5C, further details of the second cover 104 are illustrated. Specifically, further details of the alignment mechanism 122' of the first cover 104 are illustrated. Unlike the alignment mechanism 122 of the first cover 106, the alignment mechanism 122' of the second cover 104 does not comprise an aperture or notch portion 124. The alignment mechanism 122' of the second cover 104 is designed to press against a top portion of the reflecting device 114 when the second cover 104 is attached to the connector housing 102. The alignment mechanism 122' of the second cover 104 positions the reflecting device 114 in a precise X, Y and Z position relative to the lenses 300 supported by the first and second connectors 108, 110.

The second cover 104 has a square shape as illustrated in FIGS. 5A, 5B, 5C. However, other shapes for the second cover 104 are not beyond the scope of the present invention. Usually the shape of the second cover 104 and its step region 120 will match or correspond with the shape of the connector housing 102. Other shapes of the second cover 104 and step region 120 include, but are not limited to, rectangular, circular, triangular, pentagonal, and other similar shapes.

Figure 6A:
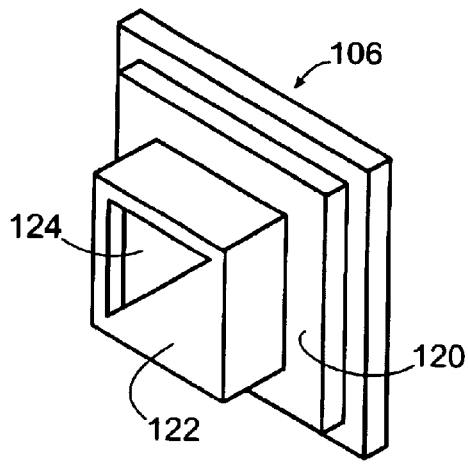
FIG. 6A is an isometric view of a cover that supports a mirror that attaches to a connector housing according to one exemplary embodiment of the present invention.
Figure 6B:
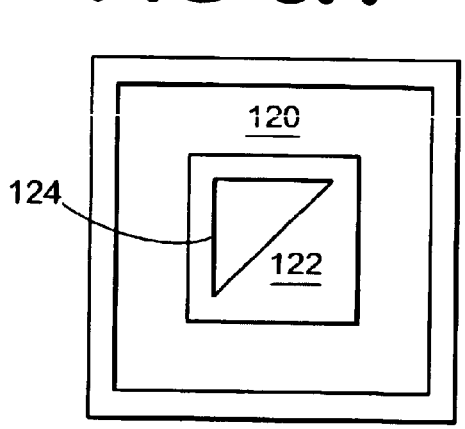
FIG. 6B is an elevational view of the exemplary cover illustrated in FIG. 6A.
Figure 6C:
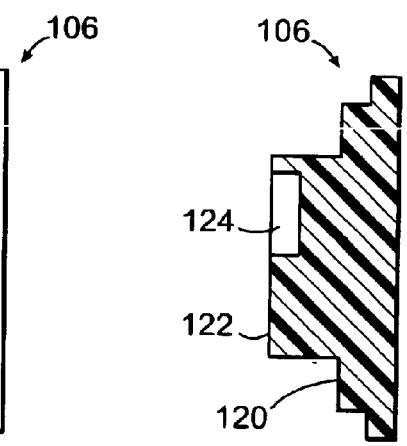
FIG. 6C is a cross-sectional view of the exemplary cover illustrated in FIG. 6B.

Referring now to FIGS. 6A, 6B and 6C, further details of the first cover 106 that support reflecting device 114 are illustrated. Specifically, the relative thicknesses of the step portion 120 and alignment mechanism 122 are illustrated. The relative depth of the aperture or cut out region 124 can further be ascertained from FIG. 6C. As noted above, the alignment mechanism 122 of the first cover 106 holds or supports the mirror 114 in a predetermined and precise location relative to the lenses 300 supported by the first and second connectors 108, 110.

In the exemplary embodiment illustrated, the step region 120 typically has a thickness or height that is less than the alignment mechanism 122. Also, the depth of the aperture or cutout region 124 can have a magnitude that is less than the height or thickness of the aperture alignment mechanism 122. However, those skilled in the art will recognize that the step region, alignment mechanism 122, and aperture 124 can be adjusted for different size mirrors depending upon the particular application of the optical coupler 100.

Figure 7A:
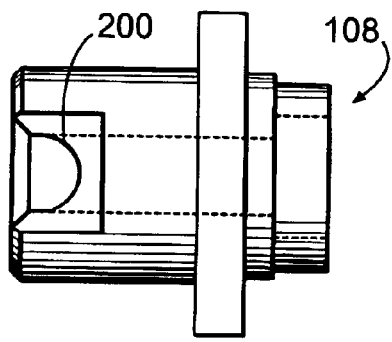
FIG. 7A is an elevational view of a connector constructed in accordance with an exemplary embodiment of the present invention.
Figure 7C:
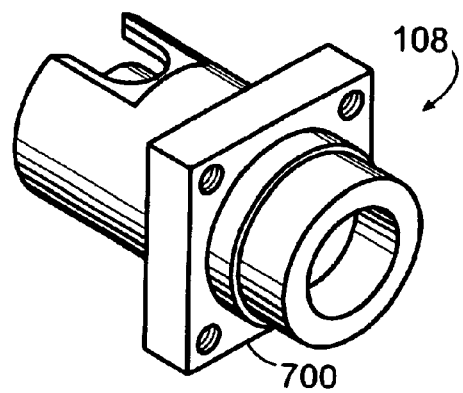
FIG. 7C is an isometric view of the exemplary connector illustrated in FIG. 7A.
Figure 7B:
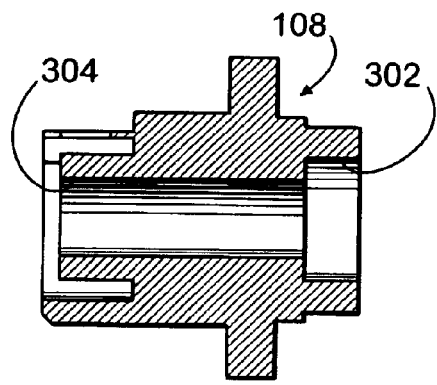
FIG. 7B is a cross-sectional view of the exemplary connector illustrated in FIG. 7A.

Referring now for FIGS. 7A, 7B, 7C, and 7D, further details of one of the exemplary connectors 108 are illustrated. For example, details of the notch region 302 and the cylindrical section 304 can be ascertained in FIG. 7B. In FIG. 7B, the lens 300 has been removed such that the geometric relationship between the cylindrical section 304 and notch region 302 can be ascertained. As noted above, the notch region 302 that supports the mirror 300 (not shown) can comprise a diameter that is greater than a diameter of the cylindrical section 304.

Figure 7D:
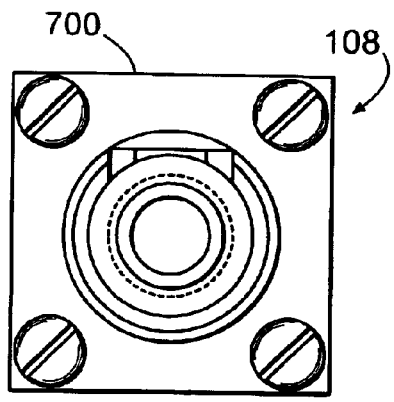
FIG. 7D is a side view of the exemplary connector illustrated in FIG. 7A.

Also, in FIGS. 7C and 7D, the first connector 108 can comprise fastening device apertures 700 that permit the insertion of fastening devices (not shown) thereto. However, those skilled in the art recognized that fastening device apertures 700 can be modified or eliminated from the connector 108 without departing from the scope and the spirit of the present invention. For example, if the connector 108 had a step region (not illustrated) similar to the step region 120 of the first and second covers 106, 104, then the fastening device apertures 700 could be eliminated since the connector 108 could have a snap fit with the connector housing 102 (not shown in FIGS. 7C and 7D).

As noted above, the connectors 108, 110 can comprise size and dimensions of any one of industry standard connectors known in the art. For example, the present invention could comprise several connectors (as illustrated) subscriber connectors, lucent connectors, FDDI connectors, and ST connectors without departing from the scope and the spirit of the present invention.

Figure 8:
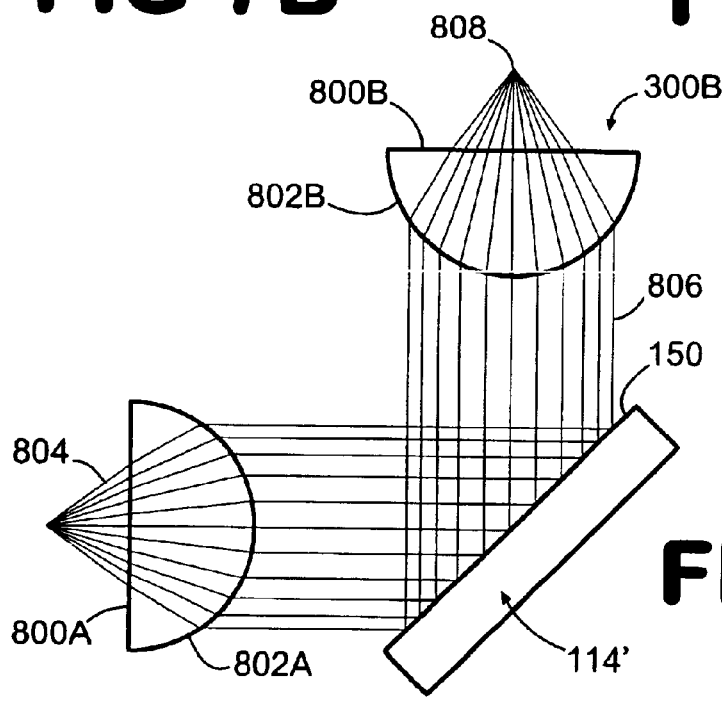
FIG. 8 illustrates optical ray tracing of optical energy coupled between two optical sources according to an optical coupler of an exemplary embodiment of the present invention.

FIG. 8 illustrates further details of the optical system contained within the optical coupler 100. Each lens 300 comprises a first planar side 800 and a second convex side 802. The convex side 802 further comprises an aspherical shape that is one important feature of the present invention. The aspherical shape of these lenses 300 means that if the two planar sides 800 of the two lenses 300 were placed next to and contacting each other, then the two opposing outside convex sides 802 would not form a perfect sphere.

While each lens 300 can be referred to as a plano-convex lens, it is the aspherical shape of the convex side 802 that collimates the optical energy received from optical waveguides in a very efficient manner. The prescription of each lens 300 is a function of the optical coupler dimensions and a function of the optical waveguides sizes and types (i.e.—single mode or multimode).

In the exemplary embodiment illustrated in FIG. 8, each convex side 802 can face the inside of the connector housing 102 towards the reflecting device 114'. As noted above, the reflecting device 114' can have various shapes other than those illustrated in the drawings. For example, comparing the reflecting device 114' of FIG. 8 to the reflecting device 114 illustrated in FIG. 2, one recognizes that the reflecting device 114' of FIG. 8 has a substantially rectangular shape while the reflecting device 114 of the FIG. 2 has a substantially triangular shape.

As illustrated in FIG. 8, for a first aspherical lens 300A, substantially all of the optical energy that exits a first optical waveguide (not shown) in a dispersion cone 804 at a predetermined angle (usually about 14 degrees) can be collected by the first planar side 800A and then collimated or expanded by the second aspherical side 802A. The collimated optical energy 806 can then be redirected or reflected by the 30 reflecting device 114'.

Then, the collimated optical energy 806 that is reflected from the reflecting device 114' can be propagated into a second spherical lens 300B. The second spherical lens 300B comprises a second aspherical side 802B that can focus the collimated optical energy into a focal point 808 corresponding directly with a central region of a second optical waveguide (not shown). The focused optical energy can then be propagated away from the second spherical lens 300B in the second optical waveguide (not shown).

Figure 9:
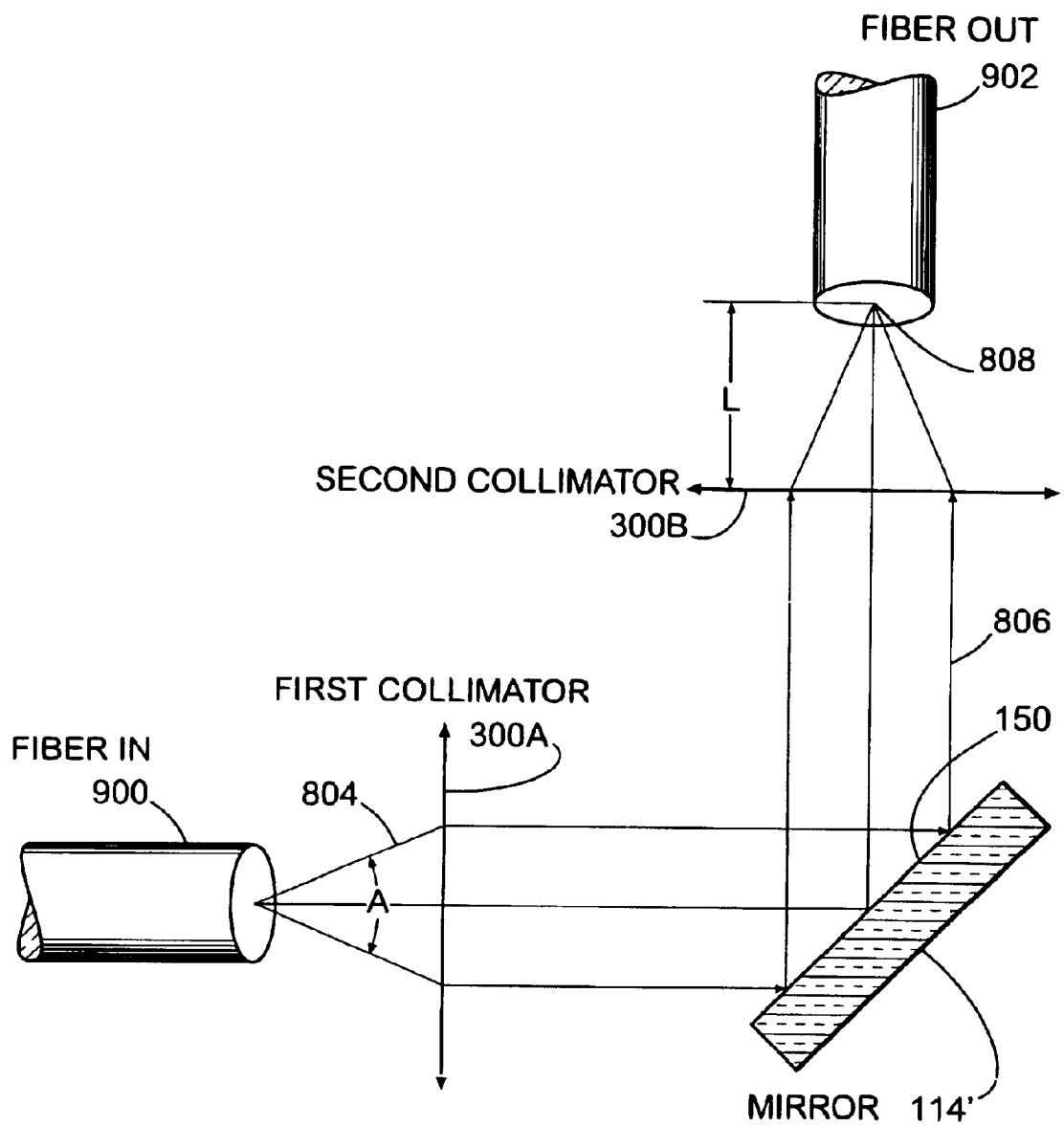
FIG. 9 is an elevational view of an optical system comprising optical waveguides according to an exemplary embodiment of the present invention.

Referring now to FIG. 9, this figure illustrates further details of the exemplary optical system illustrated in FIG. 8. Specifically, in FIG. 9, a first optical waveguide 900 and a second waveguide 902 are illustrated. The optical waveguides 900 and 902 illustrated in FIG. 9 can comprise fiber optic cables. The optical waveguides can also comprise either single mode or multimode fiber optic cables. For a single mode fiber optic cable, the core of the cable can comprise a diameter of approximately nine micrometers. Meanwhile, a one hundred-twenty-five micrometer cladding can surround the nine micrometer core of the cable. A single mode fiber optic cable will typically have an outside diameter of two millimeters.

For a multi-mode fiber, the core can typically have a sixty-two point five (62.5) micron diameter. For the cladding of the multi-mode fiber, the cladding can typically has a diameter of two-hundred fifty micrometers. An exemplary embodiment as illustrated in FIG. 1, operates more efficiently with multi-mode fiber than single mode fiber. However, the present invention maximizes the optical energy transfer between two single mode fiber optic cables, while minimizing any back reflection or other optical return losses.

As further illustrated in FIG. 9, the optical energy exiting the first or input optical waveguide 900 of an exemplary embodiment can have a dispersion angle with a magnitude of approximately fourteen degrees. Meanwhile, the prescription for the second collimator or second aspherical lens 300B in one exemplary embodiment can have a focal length of approximately 4.73 millimeters for a second receiving optical waveguide 902 that comprises a single mode fiber optic cable. Those skilled in the art will further appreciate that the term "optical waveguide" can comprise other light guiding structures other than fiber optic cables. For example, an optical waveguide can further comprise a planar or light guide circuit or other types of other optical waveguides known in the art.

Figure 10:
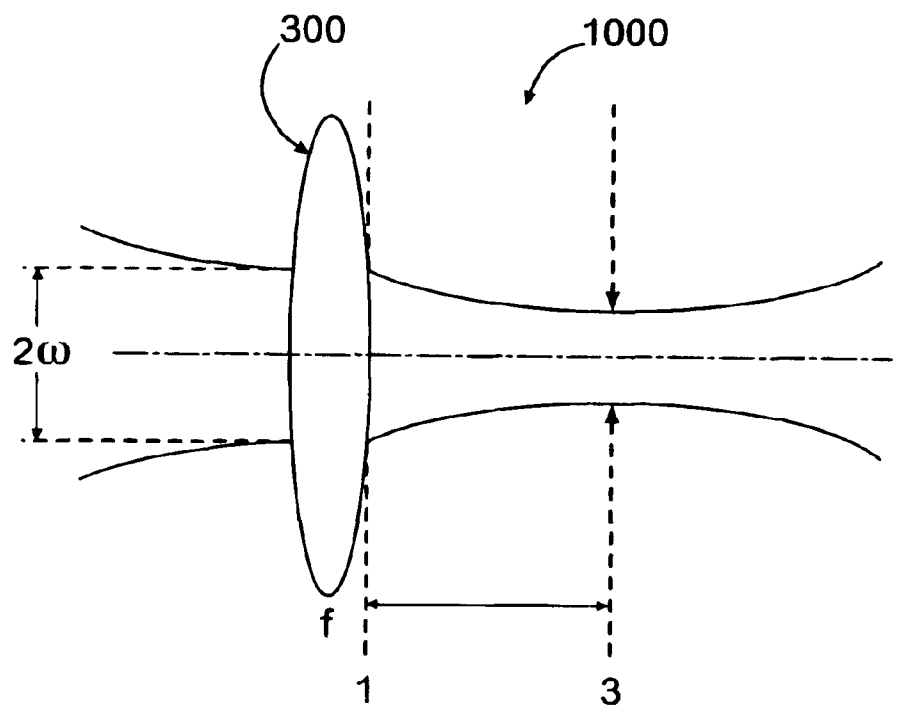
FIG. 10 illustrates a Gaussian effect of optical energy coupled and focused by the lens structures of one exemplary embodiment of the present invention.

Each lens 300 can have a diameter comprising approximately 2 millimeters in diameter. However, those skilled in the art will appreciate that the dimensions of each lens 300 can be modified or scaled in accordance with the size and types of optical waveguides being coupled. Referring now to FIG. 10, this figure illustrates the Gaussian effect 1000 of the optical energy manipulated by the lens 300. The region between reference points 1 and 3 can comprise a diffractive element that may affect the divergence of the optical energy propagating through a piano-convex lens 300. This Gaussian effect is known to those skilled in the art. The Gaussian effect enables the aspherical lens 300 to condense the collimated light onto the reflecting device 114 (not shown in FIG. 10).

Figure 11:
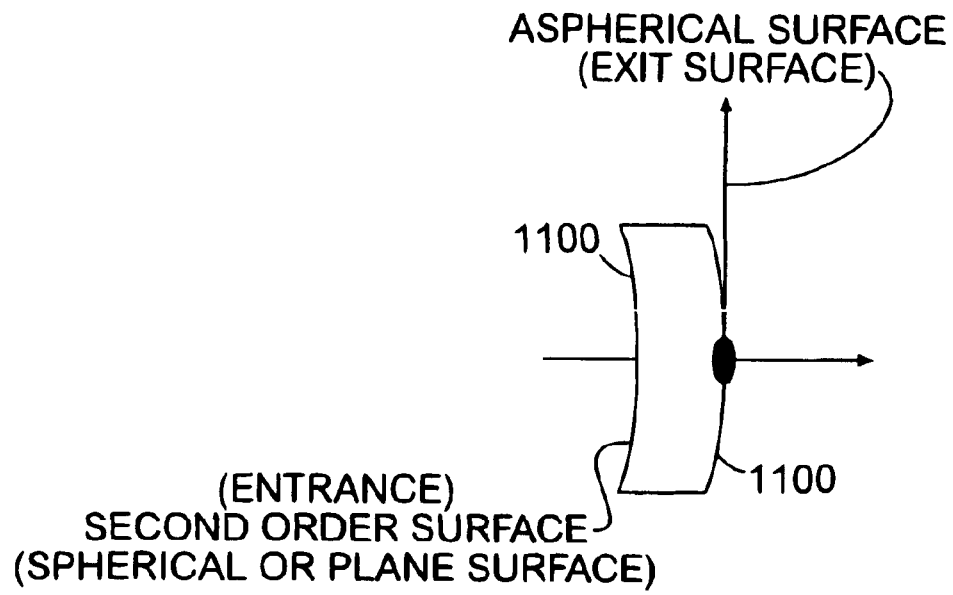
FIG. 11 illustrates an exemplary lens structure that includes anti-reflective coatings to compensate for optical energy incident at angles off-center relative to the lens structure according to an alternative exemplary embodiment of the present invention.

FIG. 11 illustrates a lens 300' according to another exemplary embodiment of the present invention. The lens 300' of FIG. 11 illustrates the effect of anti-reflective coatings 1100 present on the two services of the lens 300'. The lens 300' is mounted so as to allow for free space photonics travel. The fourteen degree conal dispersion of the optical energy or light rays from the end of the optical waveguide (not shown) can bounce or reflect off the walls of the waveguide and back into the lens on either side of the lens 300'. Therefore, a film 1100 is applied to the glass to reduce back reflection back into the lens 300'.

Figure 12:
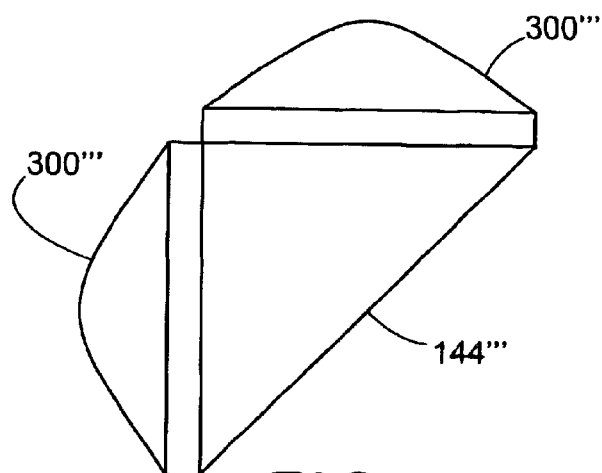
FIG. 12 illustrates a unitary optical system according to an alternative exemplary embodiment of the present invention where the optical system comprises a solid member that includes lenses and a mirror.

Referring now to FIG. 12, this figure illustrates an optical system according to an alternative exemplary embodiment of the present invention. In this exemplary embodiment, the plano-convex lenses 300" have been reoriented meaning that the convex side 802 faces the ends of the optical waveguides (not shown in this Figure) instead of the reflecting device 114". In other words, the lenses 300" are facing plano to piano side. This orientation does not typically change the collimating effect or the focal point to and from an optical waveguide (not shown in this Figure). One important aspect of this embodiment relative (as well as all of the aforementioned embodiments) is that the two aspherical plano-convex lenses 300" have geometric centers that are substantially aligned. In this exemplary embodiment of FIG. 13, the optical energy or light directed off of the reflecting element 114" will typically be smaller in diameter relative to any of the previously discussed embodiments, however, the focal length and point remains the same relative to the entry and exit spot sizes of the optical waveguides being coupled.

Figure 13:
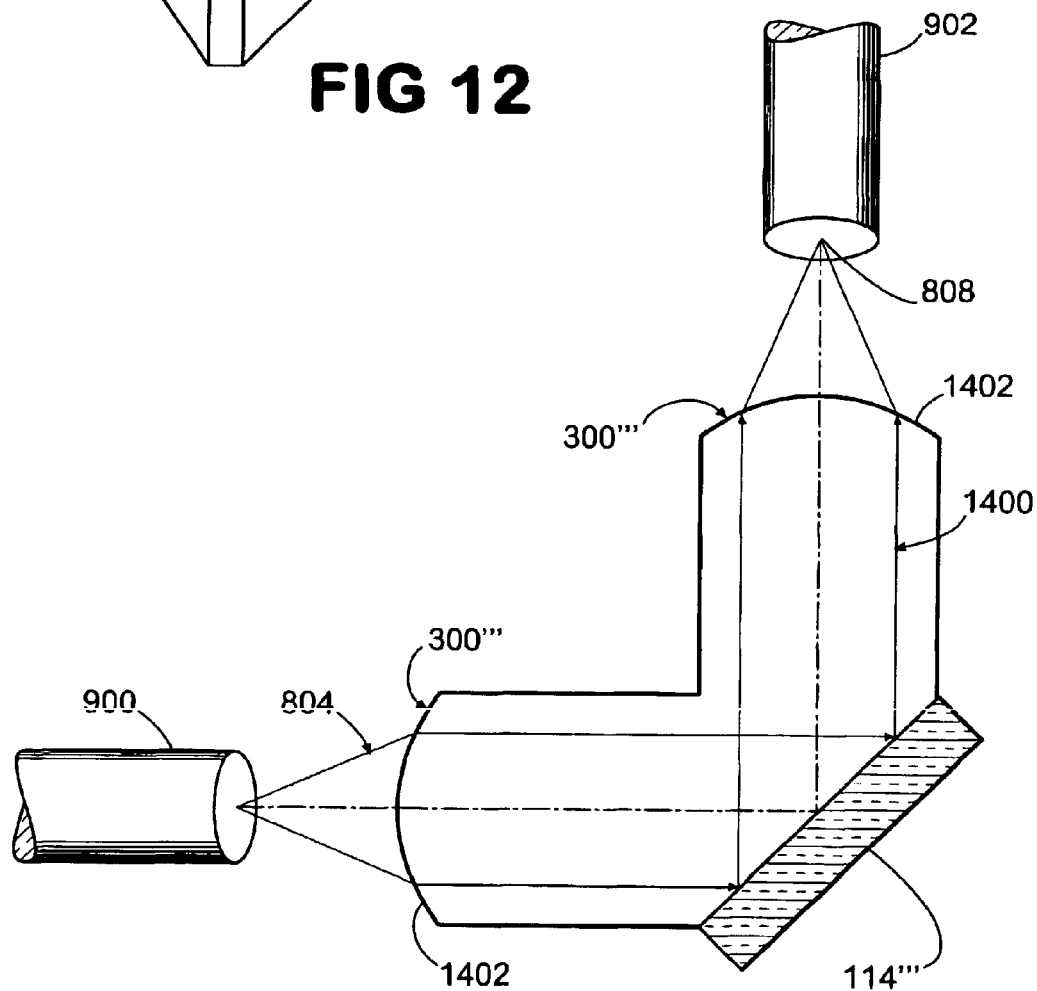
FIG. 13 illustrates yet another exemplary unitary optical system according to an alternative exemplary embodiment of the present invention where the optical system comprises a solid member that includes lenses and a Mirror.

Referring now to FIG. 13, this figure illustrates another alternative exemplary embodiment of the present invention where the lenses 300''' and the reflecting device 114''' form a uniform or single structure 1400 that can be substituted for the previously described discrete and separate optical components. This solid prism and mirror structure 1400 further comprises convex surfaces 1402 at the entry and exit portions of the structure. The unitary prism and mirror structure 1400 can be made from optical grade polycarbonate. The operation of this exemplary embodiment illustrated in FIG. 13 closely parallels the operation of the exemplary embodiment illustrated in FIG. 12.

Figure 14:
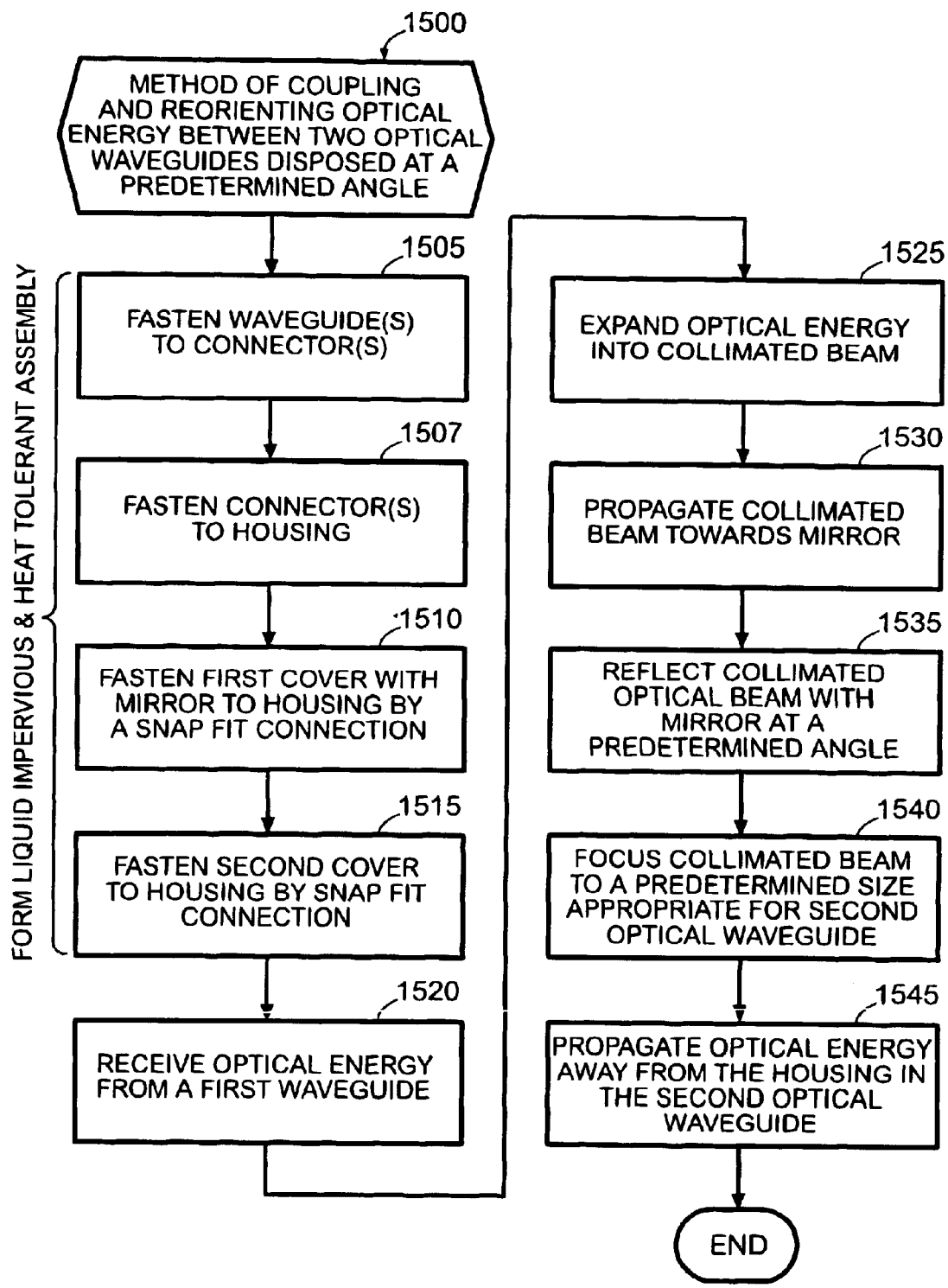
FIG. 14 is a logic flow diagram illustrating a method for coupling and reorienting optical energy between optical waveguides disposed at a predetermined angle according to an exemplary embodiment of the present invention.

FIG. 14 is a logic flow diagram illustrating an exemplary embodiment of a method 1500 for coupling and reorienting optical energy between two optical waveguides disposed at a predetermined Angle. Those skilled in the art recognize that certain steps in the process illustrated in FIG. 14 and described below must naturally precede others for the present invention to function as described. However, the present invention is not limited to the order of the steps described herein if such order or sequence does not alter the functionality of the present invention. That is, it is recognized that some steps may be performed before or after other steps without departing from the scope and spirit of the present invention.

Step 1505 is the first step of the method 1500 for coupling and reorienting optical energy. In step 1505, optical waveguides 900 and 902 can be coupled to the connectors 108, 110. Next, in step 1507, the connectors 108, 110 can be coupled to the connector housing 102.

In step 1510, the first cover 106 with the reflecting device 114 can be coupled to the connector housing with a snap fit connection. Similarly, in step 1515, the second cover 104 can be coupled to the connector housing 102 by another snap fit connection. Those skilled in the art will recognize that step 1505 through step 1515 can be completed in any order without departing from the spirit and scope of the present invention. For example, instead of coupling the connectors 108, 110 to the connector housing 102 prior to snapping the first and second covers 106, 104 to the connector housing, it is possible to first snap the covers 106, 104 and then couple the connectors 108, 110 to the connector housing 102.

In step 1520, optical energy can be received by a first lens 300A from a first waveguide 900. Next, in step 1525, the first lens 300A can expand the received optical energy into a collimated beam. Subsequently, in step 1530, the collimated beam can be propagated towards the reflecting device 114 such as a mirror. Next, in step 1535, the reflecting device 114 can direct or reflect the collimated optical beam at a predetermined angle.

In step 1540, the reflected collimated beam can be focused with the second lens 300B to a predetermined size and at a predetermined focal length for a second optical waveguide 902. Next, the optical energy received by the second optical waveguide can be propagated away from the housing 102 and the second lens 300B and the second optical waveguide 902.

In view of the foregoing, the present invention permits adjustments to the optics housed in an optical coupler while in the field or operating environment. In other words, the present invention provides an optical coupler that has field-adjustable optics to permit the adaptation of the optical coupler to various types and sizes of optical waveguides.

Further, the optical coupler is impervious to any liquids that are present in the operating environment of the optical coupler and optical waveguides. Also, the optical coupler can withstand harsh operating environments where the optical coupler can be subjected to high temperatures. Because of its ability to withstand such operating environments, the optical coupler of the present invention can meet or exceed industry standards for optical connectors.

The optical coupler maximizes the optical energy transfer between two optical waveguides through the precise prescription of the lenses as well as their predetermined and steady position, while minimizing any back reflection or other optical return losses. The optical coupler of the present invention provides automatic core-to-core alignment of optical waveguides in free space by simply attaching connectors to a connector housing that automatically aligns the core of optical waveguides being coupled together.

It should be understood that the foregoing relates only to illustrated embodiments of the present invention, and that numerous changes may be made therein without departing from the spirit and scope of the invention as defined by the following claims.

What is claimed is:

1. A method for coupling and redirecting optical energy between two optical waveguides oriented at a predetermined angle relative to each other, comprising the steps of:
    receiving optical energy from a first optical waveguide (1520);
    expanding the received optical energy into a collimated beam of optical energy with a first aspherical lens (1525);
    propagating the collimated beam towards a reflecting device (1530);
    redirecting the collimated beam with the reflecting device at a predetermined angle (1535);
    focusing the reflected and collimated beam to a size appropriate for a second optical waveguide with a second aspherical lens (1540); and
    propagating the focused optical energy away from the housing in the second optical waveguide (1545).

2. The method of claim 1, further comprising the steps of:
    forming a liquid impervious and beat tolerant optical coupler by:
        attaching the first optical waveguide to a first connector (1505);
        attaching the second optical waveguide to second connector (1505);
        attaching the first and second connectors to a housing (1507);
        attaching a first cover to the housing (1510); and
        attaching a second cover to the housing (1515).

3. The method of claim 1, further comprising the steps of:
    forming a liquid impervious and heat tolerant optical coupler by:
        coupling first and second connectors to a housing (1505);
        snapping a first cover to the housing (1510); and
    snapping a second cover to the housing (1515).

4. The method of claim 1, wherein the step of redirecting the collimated beam with the reflecting device at a predetermined angle further comprises redirecting the collimated beam with a mirror.

5. The method of claim 1, wherein the step of redirecting the collimated beam with the reflecting device at a predetermined angle further comprises redirecting the collimated beam at an angle comprising approximately ninety degrees.

6. A method for redirecting optical energy between two optical waveguides, comprising:
    collimating a beam of optical energy from a first optical waveguide with a first aspherical lens;
    directing the beam towards a reflector;
    changing direction of the beam with the reflector at a predetermined angle;
    sizing the beam with a second aspherical lens to a size appropriate for a second optical waveguide; and
    directing the beam away from the second aspherical lens in the second optical waveguide.

7. The method of claim 6, further comprising:
    forming a liquid impervious and heat tolerant optical coupler by attaching the first optical waveguide to a first connector and attaching the second optical waveguide to a second connector.

8. The method of claim 7, further comprising:
    attaching the first and second connectors to a housing;
    attaching a first cover supporting the reflector to the housing; and
    attaching a second cover to the housing.

9. The method of claim 6, wherein changing the direction of the beam with the reflector at a predetermined angle further comprises changing the direction of the beam with a mirror.

10. The method of claim 6, wherein changing the direction of the beam with the reflector at a predetermined angle further comprises changing the direction of the beam with a mirror that comprises a reflectivity of less than one-hundred percent.

11. The method of claim 6, wherein changing the direction of the beam with the reflector at a predetermined angle further comprises changing the direction of the beam with a mirror that comprises at least one reflective side.

12. The method of claim 6, wherein changing direction of the beam with the reflector at a predetermined angle further comprises redirecting the beam at an angle comprising approximately ninety degrees.

* * * * *